United States Patent Office

3,284,209
Patented Nov. 8, 1966

3,284,209
RE-EXPANDING COMPRESSED EXFOLIATED VERMICULITE
Joseph A. Kelley, Chicago, Ill., assignor, by mesne assignments, to W. R. Grace & Co., New York, N.Y., a corporation of Connecticut
No Drawing. Filed Oct. 6, 1960, Ser. No. 60,771
3 Claims. (Cl. 99—2)

This invention relates to unique vermiculite compositions having new and unique properties.

Vermiculite is a micaceous mineral that expands or exfoliates appreciably when heated to result in a lightweight, porous material having many uses in the construction and agricultural industries, including the production of fireproof plasters and cements, of insulating bricks and the like, of insulation, fertilizer conditioners, chemical carriers, soil conditioners, bedding for flower cuttings and seed propagation, and in the food and pharmaceutical industries for the production of anti-caking and conditioning agents, carriers of essential, concentrated nutrients, carriers of medications and as complexing agents in preventing mineral antagonism in animal nutrition, for example.

Most of the important commercial uses for vermiculite are in its expanded or exfoliated forms. Because of its inherent low bulk density when expanded, which may vary, typically from 4 to 15 pounds per cubic foot, its production and distribution has evolved around the practice of shipping vermiculite ore which has been beneficiated, refined, concentrated, cleaned, and classified according to particle size and other properties, to expanding plants located in industrially strategic locations around the country in order to take advantage of the freight differentials involved in shipping vermiculite ore when contrasted with expended vermiculite.

Vermiculite ore, in the form in which it leaves the mine or mill for its subsequent receipt and processing in an expansion plant, is in such a condition that when exfoliated it will become a finished product ready for various commercial utilizations, i.e., it has been prepared to a predetermined moisture content and size so that upon subsequent expansion the resulting product will conform to established specifications. When the vermiculite ore concentrate reaches the expanding plant, it is unloaded and segregated in various storage bins following which it is subsequently conveyed and fed into furnaces where the vermiculite is rapidly expanded usually at temperatures ranging from approximately 1,200 to 1,800° F. following which the material is subjected to separating techniques to remove impurities, rock, slag, gangue, etc. after which the finished product is classified and stored or packaged.

The time and temperature conditions applied in thermal expansion of vermiculite ore concentrate should be such as will result preferably in the production of relatively soft and pliable particles of expanded or exfoliated vermiculite, such particles being more readily and satisfactorily compactible than when the particles are relatively brittle or friable. The degree of pliability for generally satisfactory compaction or compression of expanded vermicuite in accordance with my invention can be readily determined by testing the same according to the method set forth in Canadian Patent 598,269 entitled "Determination of Properties of Exfoliated Vermiculite" by George E. Ziegler and John J. Wiard and issued May 17, 1960.

There are a number of important disadvantages of the conventional system of producing expanded vermiculite, and even of the finished product itself. For example, vermiculite ore contains about 10% moisture and its shipment in usable forms for producing satisfactory types of expanded products involves, of course, the shipment of that amount of moisture and the payment of freight thereon. Furthermore, expanding vermiculite ore at or near the point of ultimate use involves considerable capital expenditure, which circumstance has frequently served to discourage the use of expanded vermiculite. Conversely, the freight charges for transporting expanded vermiculite with bulk densities varying from ½ to ⅕ that of its parent ore concentrates are usually prohibitive. Furthermore, the granular products obtained by exfoliation according to conventional methods results in particulate materials which have little strength per se; combining the particles by means of binder or adhesives merely results in an article of comparatively light weight and with no greater strength than that of the binder itself.

Also dependent upon the uses to which the compacted or compressed vermiculite compositions of this invention are to be subjected, their varying properties and degrees of re-expansion demand a flexibility of processing so as to obtain desired results.

Consequently, an important object of my invention is to provide new and useful forms of vermiculite as well as of compositions containing vermiculite as an essential component.

Another object of my invention is to provide expanded vermiculite in the form of unique self-sustaining, readily shippable units of enhanced bulk densities.

Another object is to provide a unique form of expanded vermiculite per se having utility in the production of improved cementitious structures, board structures and other fire resistant structures.

Still another object is to provide a unique form of expanded vermiculite which, although compressed to a higher bulk density than that of its original parent ore concentrate from which it is prepared, will quickly re-expand to a substantial percentage of its originally expanded volume when immersed in water and other liquids.

A further object is to provide a unique composition comprising expanded vermiculite and chemical and/or biological materials, including seeds, which composition has been jointly compressed and which can be effectively dispersed upon re-expansion of the vermiculite vehicle when the compressed vermiculite compositions are contacted with liquids or exposed to moist environments.

Toward the accomplishment of the above and other objects and in accordance with the present invention, vermiculite ore is expanded and extraneous substances removed, following customary practice, after which the expanded vermiculite with or without other admixed materials is formed into a sheet, film, block, pellet or tablet, or the like, by compression of either the expanded vermiculite per se or of the mixture of expanded vermiculite and the other materials.

The resulting products, dependent upon their intended utilizations, can either be disintegrated into particles in dry form, or readily dispersed in water or other liquid. In those instances where the resulting product is disintegrated compacted vermiculite per se, it can be utilized in making, for example, wood fiber products, such as board and paper, incombustible or semi-incombustible articles of various kinds as a replacement for asbestos and like materials in producing moldable, extruded or other shapes by means of organic materials as binders, and as an ingredient in materials which are bound together with cementitious materials such as gypsum, Portland cement and the like. Other binders can, of course, also be used.

In those instances where the expanded vermiculite is in admixture with dry materials which are in relatively finer particulate form than their vermiculite carrier, or with liquid materials which have been premixed with, or previously dried on the expanded vermiculite carrier, such vermiculite composition can be compressed with the result that upon subsequent exposure to liquids, such as water or gastric juices and the like, or to moist optimal environments, their compacted vermiculite carriers will instantaneously commence to re-expand and in so doing expedite the dispersal of the admixed materials thereby rendering them available for ensuing biological and/or chemical reactions, nutritional availability, or other nautral phenomena.

When viable seeds are previously admixed with expanded vermiculite and the composition compressed so as not to crush the entrained seeds, the composition can be moistened, warmed to induce the early propagation of its entrained seeds and then planted for its subsequent natural growth, thus expediting its ultimate harvesting and particularly so if in addition to the original composition, the proper nutrients are introduced into the original composition to stimulate plant growth.

My new form of vermiculite can be produced by compressing exfoliated vermiculite into blocks using the techniques and equipment utilized in forming salt blocks; or by extruding compressed exfoliated vermiculite through a die; or by forming a sheet or film as by passing the exfoliated vermiculite between rollers; or by stamping pellets, tablets or "slugs" of compressed expanded vermiculite.

In effecting compaction it is preferred, for best results, that if possible the pressure be applied to the vermiculite from several directions so as to minimize variation n the bulk density of the compressed structure. In one embodiment my new form of vermiculite has a moisture content significantly less than one percent, a minimum content of impurities such as rock, gangue and the like and a bulk density ranging up to 130 pounds per cubic foot and even higher.

Illustrative of the production of one form of a compressed vermiculite in accordance with my invention, is the following:

Exfoliated vermiculite is rolled between heavy steel rolls and emerges as a sheet which has a density depending on the pressure exerted by the rolls. Illustratively the rolls may have a diameter of 10 inches and a width as large as desired, conveniently 16 inches. The speed of the rolls should be coordinated with the feed rate in order to obtain proper sheet thickness, the faster the roll speed, the faster the feed rate to the roll; there is a point of course where the rolls will not pick up the grains of exfoliated vermiculite fast enough to make a sheet even though the feed rate is sufficiently high; this point can be increased by increasing the dameter of the rolls used. The vermiculite used should be as pure as possible, since any abrasive material present will not only blemish the sheet produced but also increase the wear on the rolls. If the moisture in the vermiculite is above about 5 percent there is a tendency of the sheet to stick to the rolls when pressed. The pressure required to form a sheet of a particular density is higher when the vermiculite is bone dry than when it has, for example, 1 or 2 percent adsorbed moisture. The use of rolls, like those above-described, which operate at 50 r.p.m. results in 14-inch wide sheets up to $\frac{1}{32}$ inch thick, and with a density of 50 pounds per cubic foot. The sheet, after production, can be removed as a more or less continuous sheet or it can be folded back and forth on itself to produce a bundle of sheets.

The above-described sheeting may have incorporated therewith adhesive binders, aqueous as well as non-aqueous, which can be added before or after passage through the forming rolls to result in a sheet having increased cohesive strength. For example, the already formed sheeting may be sprayed, dusted, or sprinkled with thermoplastic resinous binders, as it leaves the forming rolls or later, and the sheeting subjected to heat with or without additonal pressure to further integrate the particulated components of the sheeting.

Vermiculite sheeting may also be applied by using adhesives as needed, to various materials such as aluminum foil, sheet steel, plastic sheetings or films of, for example, regenerated cellulose, polyethylene, saran, polystyrene, nylon, Teflon, and the like, to form desirable multi-ply laminates. Laminate structures can also be formed using alternate or intermixed layers of various materials including as an essential layer the compressed vermiculite sheeting above-described, to form other multiply laminates having new and unusual properties and utilities. Compacted exfoliated vermiculite sheetings, per se, or strengthened with binders, as well as with fibrous materials such as glass fibers for example, and in single-ply or laminate form, have particularly desirable utility, especially if suitably "backed" with other sheet materials—such as aluminum foil or plastic sheeting—as functional and decorative wall and floor coverings and the like.

I have found that in preparing compressed forms of exfoliated vermiculite, it is desirable in order to get good compaction with coincidental maximum bonding effects to thermally expand the original parent vermiculite ore under conditions of time and temperature treatments so that the resulting product will retain not more than about 80% of its original volume after wetting and drying, as determined by the method set forth in the Ziegler and Wiard patent identified above. Very good results are obtained when the exfoliated vermiculite will retain 58 to 65% of its original volume. Improved compaction results can be attained when the exfoliated vermiculite will retain less than 58% of its original volume but as its degree of volume retention falls below this figure the commercial yields of exfoliated vermiculite obtained by thermal expansion become uneconomically low. Pliable exfoliated vermiculite that gives good compaction characteristics normally is thermally expanded in temperatures ranging from 1,200 to 1,600° F. with minimum time exposures. The higher the temperature, the more brittle the expanded vermiculite becomes and the more pressure that is required to give comparable bulk densities to those obtained with more favorable thermal conditions. Normally, vermiculite ore containing less than 5% extraneous materials such as rock, slag, gangue, and the like, when thermally exfoliated to retain 65% of its original volume with dominant screen fractions of 16 to 40 mesh particle sizes upon expansion will give the approximate bulk densities listed below when compressed at the pressures indicated:

| Compressed at p.s.i. | Approximate bulk density, lb./cu. ft. |
|---|---|
| 200 | 39 |
| 1000 | 55 |
| 3400 | 100 |
| 16000 | 130 |

For example, vermiculite ore which has been thermally expanded to retain 90 percent of the original volume of its expanded product, and then compressed at 16,000 p.s.i. will have an approximate bulk density of 100 pounds per cubic foot, as compared with the 130 pounds per cubic foot bulk density of the identical ore thermally expanded so as to retain 65% of the original volume of its expanded product. Thus, the criteria to be followed in controlling compressibility of expanded vermiculite products are those of its retention of their original volumes by the method as identified above inasmuch as the variable design of expanding furnaces make it impossible to rely on empirical time and temperature factors.

The shipment of a compacted vermiculite per se in block, sheet, film, pellet or tablet form, as described above, eliminates the need for users having thermal expanding facilities, thus greatly enhancing the potential utilizations of vermiculite products.

A novel vermiculite composition product produced in accordance with my invention is formed by compressing 60–80% dried black strap molasses, dried corn steep water, or dried fish soluables on 40–20% of expanded vermiculite at approximately 16,000 p.s.i. The resulting product is relatively non-hygroscopic but is readily dispersed when immersed in water, for example.

Other interesting compositions containing medicinals, enzymes as well as other chemical and biological materials admixed in varying proportions with properly expanded vermiculite and compressed to form tablets coated with enteric coatings have proven efficacious in permitting the re-expansion of their vermiculite carriers in the gastric juices of ingesting animals without the inconvenience of any premature re-expansion in the mouth or throats of ingesting animals. The re-expansion of such vermiculite carriers always hastens the dispersion of the carried nutrients, pharmaceuticals, and the like.

My invention will be further illustrated in the following representative embodiment of new vermiculite-containing compositions. It is to be understood that the following are illustrative examples only and are not to be construed in a limiting sense:

*Example I.—Production of black-strap molasses— vermiculite product*

I have found that 150 pounds of properly expanded vermiculite of dominant screen fractions of 16 to 40 mesh particles will readily absorb a hot mixture (approximately 250° F.) of 350 pounds of black-strap molasses and 50 pounds of water and permit its subsequent drying in a rotary dryer when operating such dryer so as to produce a dry composition containing approximately 60% dry molasses solids at a discharge temperature of 170–180° F. Additional molasses solids can be dried on this vermiculite-molasses product by appropriately recycling with subsequent hot molasses additions through the same dryer to result in a product containing up to 80% dry molasses solids. Either black-strap molasses vermiculite product may then be compressed at a pressure of 16,000 p.s.i., for example, to form a relatively firm, hard, non-hygroscpic product which upon immersion in water will leach out the molasses and in the process cause the contained vermiculite carriers to re-expand and thus hasten the disintegration of such immersed completed blocks in water.

*Example II.—Production of fish soluables or condensed corn steep water—vermiculite product*

I have also found that 150 pounds of properly expanded vermiculite of dominant screen fractions of 16 and 40 mesh particles will readily absorb 450 pounds of hot (approximately 250° F.) condensed fish soluables or condensed corn steep water (both of 50% solids' contents) —both products normally used as animal nutrients—and permit their subsequent drying in a rotary dryer when operating such dryer so as to produce dry products containing 60% condensed fish soluables' solids or condensed steep water solids at a discharge temperature of 170–180° F. Similarly additional fish soluables solids or corn steep water solids can be dried on corresponding vermiculite-fish soluables or vermiculate-corn steep water products to result in compositions containing up to 80% dry nutrient solids. All such dried products on their expanded vermiculiate carriers may then be compressed to form relatively non-hygroscopic products which upon immersion in water will leach out the contained nutrient solids and in the process cause their vermiculite carriers to re-expand and thus hasten their disintegration in water.

*Example III.—Production of kelp-vermiculite product*

In addition to the foregoing examples of wet materials dried on properly exfoliated vermiculite, I have also found that dry mixtures incoporating other materials can be similiarly compacted. For example, I have found that 400 pounds of properly expanded vermiculite of dominant screen fractions of 8 to 30 mesh particles can be mixed with 600 pounds of dried kelp of dominant screen fractions of 80 to 100 mesh particles and completely mask the presence to the naked eye of the dried kelp so admixed. Microscopic examination revealed that the particle of dried kelp had been forced into the interstices of the exfoliated vermiculite which accounted for the apparent resulting masking of their presence. This vermiculate-kelp composition was then compressed to form a relatively hard disc at a pressure of 16,000 p.s.i. which upon immersion in water leached out the hydro-colloid particles of kelp as its vermiculite carrier began to re-expand to result in rapid disintegration of the compressed disc.

Similarly, I have made tablets of a mixture of finely ground refined vermiculite per se of dominant screen fractions of 100 mesh particles with properly exfoliated vermiculite carrier in similar proportions to those of the vermiculite-kelp product described above and with similar results upon their subsequent immersion in water. Furthermore, I have coated such tablets with enteric coatings in order to prepare them for investigation of their mineral complexing properties in animal nutrition—the refined vermiculite incorporated being possessed of maximum physiological properties which are dissipated in thermal exfoliation of vermiculite. In this latter case, the exfoliated vermiculite acts soley as carrier of its refined vermiculite content so as to permit the composition to be compressed into suitable table form and subsequently release its carried vermiculite per se when ingested by experimental animals, to fix cesium 137 and other radioactive isotopes.

Similarly, I have made tablets of trace mineral compostion by incorporating, for example, 150 grams of a variety of salts of such mineral elements as cobalt, maganese, iron, zinc, copper, potassium, iodine and the like in 5 pounds of properly exfoliated vermiculite prior to their compaction into tablets as described above.

I have found that a compacted form of properly exfoliated vermiculite, in either rolled or plugged forms, when forced under positive pressure through orifices of, for example, 1/8 to 1/4 inch in diameter without any incidental incorporation af air, followed by screening through a 20 mesh screen so as to result in densities exceeding 50 pounds per cubic foot can be utilized in the calorie reduction of food mixtures, for example. The relatively higher bulk density of such treated exfoliated vermiculite permits its incorporation in amounts as high as 30% by weight, with subsequent volume expansion of the food mixture when introduced into wet mixtures, thus resulting in unit products having as much as a 50% overall calorie reduction as in baked crackers and biscuits, for example.

Futhermore, compacted exfoliated vermiculites which has been reduced in size as outlined above can also be utilized to form tablets or pills without the use of binders or added water, which tablets or pills will retain their form when compressed under pressures varying from 7,000 to 30,000 p.s.i., inasmuch as the resulting products do not vary appreciably in their densities.

I have also found that when 20% by weight of the compacted and size-reduced expanded vermiculite as described above is mixed with 80% by weight of either finely ground refined vermiculite preheated with calcium or with sodium ions (in accordance with Canadian Patent 598,532 issued May 24, 1960 to John C. Hayes) such mixture will readily form pills or tablets of high bulk density (and therefore of enhanced dosage concentrations) having utility in the adsorption of sodium ions and of potassium ions involved in electrolyte mineral balances and which thus provide for their elimininnation through the alimentary tracts of human patients suffering from edema and uremic acid poisoning symptoms, respectively. A further use of the calcium pretreated vermiculite in the re-compacted expanded vermiculite mixture is in absorption of strontium 90, and of the sodium preheated vermiculite composition in adsorption of cesium 137 which has been ingested by animals and humans.

The above examples are merely illustrative of many similar applications which can be made with properly exfoliated vermiculite as the carrier of various materials whose dispersion can be facilitated when their expanded vermiculite compositions can be compacted to form various forms of compressed products. Among the additional products using compacted exfoliated vermiculite are films or sheets of compacted exfoliated vermiculite carriers, in strip form, and carrying appropriately spaced seeds to permit their ready planting on suitably prepared soils.

The addition of water in small quantities, up to about 10% based on the weight of vermiculite, for some reason not clearly understood at the present time appears to aid in the production of more strongly cohesive integrated forms—e.g., blocks, sheets, slugs and pellets—of compressed exfoliated vermiculite. In place of water other liquids may be used including liquids containing nutrients, chemicals, pharmaceuticals, trace elements, condiments, wetting agents, and the like.

Production of the unique form of vermiculite in accordance with my invention, whether by passage of a mass of expanded vermiculite particles between rollers, or by compacting a mass of expanded vermiculite particles into blocks, in the manner in which salt blocks such as are used in cattle feeding, are formed, results in putting the particles in crystalline flake form and in cohesively securing the flakes together. For effective cohesion of the particles, sufficient to make the resulting structure more or less self-sustaining, I have found that with, for example, about 5% of added water, compression at about 75 p.s.i., or greater, gives a product which is satisfactorily integrated, i.e., self-sustaining in its structural form, but which will yet freely disperse when placed in aqueous fluids. If the expanded vermiculite is bone dry, then higher pressures, of the order of 16,000 p.s.i., or greater, are needed to secure a web, block, pill, pellet or slug which is structurally self-sustaining but yet readily dispersible in water.

A desirable density in the compressed product is around 40–80 pounds per cubic foot though densities much lower, or even as high as about 130, or higher, can be obtained if desired. If the product has a greater denstiy than in this range, of around 40–80 pounds per cubic foot however, the flakes of vermiculite appear to break down to an excessive degree, and are less readily dispersible when immersed in an aqueous fluid.

It will be understood that various changes, modifications and alterations may be made in the instant invention without departing from the spirit and scope thereof and, as such, the invention is not to be limited except by the appended claims, wherein:

I claim:

1. In the process of re-expanding compressed exfoliated vermiculite which has been formed into a unitary, self-supporting structure having a density of about 40–130 pounds per cubic foot by subjection to severe compressive forces the improvement which comprises contacting said structure of compressed exfoliated vermiculite after subjection to severe compressive forces with an aqueous fluid.

2. The process of claim 1 wherein said structure of compressed exfoliated vermiculite contains nutrient materials in admixture with the exfoliated vermiculite.

3. The process of claim 1 wherein said unitary self-supporting structure is a tablet.

References Cited by the Examiner

UNITED STATES PATENTS

| | | | |
|---|---|---|---|
| 1,922,448 | 8/1933 | Miner | 252—378 |
| 1,972,390 | 9/1934 | Miner | 99—2 |
| 2,030,239 | 2/1936 | Byers | 252—378 |
| 2,341,800 | 2/1944 | Martin et al. | 99—2 |
| 2,486,426 | 11/1949 | McGaha | 99—4 |

A. LOUIS MONACELL, *Primary Examiner.*

ABRAHAM H. WINKELSTEIN, *Examiner.*